United States Patent [19]

Thoma

[11] 4,384,924

[45] May 24, 1983

[54] METHOD OF SEPARATING ACIDS AND BASES WHICH HAVE BEEN CARRIED ALONG IN THE VAPORS FORMED DURING DISTILLATION

[76] Inventor: Matthias Thoma, Johann-Strauss-Str. 8, D-8264 Waldkraiburg, Fed. Rep. of Germany

[21] Appl. No.: 168,104

[22] Filed: Jul. 14, 1980

[30] Foreign Application Priority Data

Sep. 22, 1979 [DE] Fed. Rep. of Germany ....... 2938424

[51] Int. Cl.$^3$ .......................... C02F 1/04; C01B 17/88; C01C 1/18
[52] U.S. Cl. ........................................ 203/11; 203/12; 203/13; 203/29; 203/33; 203/36; 203/47; 203/48; 203/77; 159/47.1; 423/396; 423/523; 423/531; 564/230; 564/242
[58] Field of Search ................... 423/390 P, 396, 523, 423/531, 235; 564/230, 242; 203/10–13, 42, 41, 48, 47, 33–37, 74, 77, 81; 159/47 R, 47 WL

[56] References Cited

U.S. PATENT DOCUMENTS

| | | |
|---|---|---|
| 864,217 | 8/1907 | Wolfenstein et al. ................ 203/33 |
| 1,832,853 | 11/1931 | Bennett ................................ 203/13 |
| 1,928,749 | 10/1933 | Zeisberg ............................... 203/13 |
| 2,167,464 | 7/1939 | Rogers et al. ....................... 423/396 |
| 2,463,453 | 3/1949 | Beardsley ............................. 203/33 |
| 2,551,569 | 5/1951 | Strelzoff .............................. 423/396 |
| 2,949,484 | 8/1960 | Mackay ................................ 564/242 |
| 3,043,878 | 7/1962 | Roberts et al. ...................... 564/242 |
| 3,433,718 | 3/1969 | Yodis .................................... 203/33 |
| 4,151,265 | 4/1979 | Ethington ........................... 423/235 |
| 4,219,534 | 8/1980 | Ethington ........................... 423/235 |

Primary Examiner—Wilbur L. Bascomb, Jr.
Attorney, Agent, or Firm—Oblon, Fisher, Spivak, McClelland & Maier

[57] ABSTRACT

A method of separating acids or bases from vapors which are conveyed along with distillation vapors during concentration of a solution, comprising, passing said distillation vapors containing an acid or base, while being maintained at their existing pressure and temperature, through a salt solution which boils at said temperature and pressure, wherein, if an acid is to be removed from the distillation vapors, the salt solution contains a salt having an anion corresponding to that of the acid while being supplied with a base in an amount required to neutralize the acid, the cation of the base proportion corresponding to that of the salt, while, if a base is to be removed from the distillation vapors, the salt solution contains a salt having a cation corresponding to that of the base while being supplied with an acid in an amount required to neutralize the base in the distillation vapors, the anion of the acid corresponding to that of the salt so that salts are formed during neutralization which correspond to those of the salt solution, the salts being obtained by distilling the salt solution and the distillation vapors obtained, with the acid or the base being removed, being condensed as pure water.

7 Claims, 1 Drawing Figure

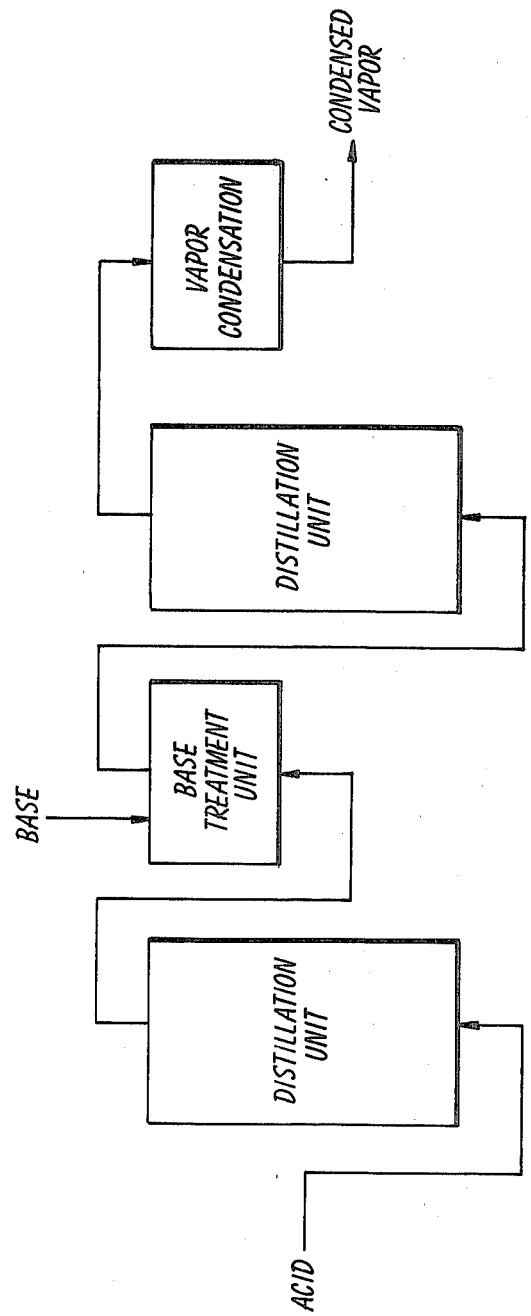

METHOD OF SEPARATING ACIDS AND BASES WHICH HAVE BEEN CARRIED ALONG IN THE VAPORS FORMED DURING DISTILLATION

The invention relates to a method of separating acids and bases carried along with the vapors formed by distillation when concentrating acids or bases.

Many chemical reactions produce wash waters which contain 0.5 to 5% or more of volatile acids or bases which can not be simply discharged into rivers for disposal because of current laws which regulate the levels of purity of river waters.

Many acids and alkalies cannot be eliminated from water by neutralization or at least it is very expensive to do so, since the cheap neutralizing agents which are in common use, such as calcium carbonate, sodium hydroxide and the like, do not result in the precipitation of salts from such low percentage washing acids because of the good solubility of their salts. Distillatory separation is not possible in many cases either or at least can only be implemented with use of large amounts of energy, since acids such as hydrochloric acid, nitric acid and, acetic acid and or bases such as ammonia and the like are either partly or completely carried along with the distillate. Obtaining these acids by distillation can therefore only be achieved if the acid or base is first converted into a salt with appropriate cations and if the water is subsequently removed by distillation.

The invention provides a method by which acids and bases may be separated in quantity from distillation vapors with which they have been carried along once a certain pressure/temperature ratio has been achieved in the boiling medium, without expenditure of energy.

Briefly the present invention, provides a method of separating acids or bases carried along with distillation vapors during concentration, of an acid or base containing solution by passing the distillation vapors, while being maintained at their existing pressure and temperature, through a salt solution which boils at that temperature and pressure, wherein, if an acid is to be removed from the distillation vapors, the salt solution contains a salt with an anion corresponding to that of the acid while being supplied with a base in an amount required to neutralize the acid, the cation of the base corresponding to that of salt, while, if a base is to be removed from the distillation vapors, the salt solution contains a salt with a cation corresponding to that of the base while being supplied with an acid in an amount required to neutralize the base in the distillation vapors, the anion of the acid corresponding to that of the salt, so that salts are formed during neutralization which correspond to those of the salt solution, the salts being obtained by distilling the salt solution and the distillation vapors with the acid or the base removed are condensed as pure distilled water.

By proceeding in accordance with the invention the appropriate salts are obtained in pure form and fresh distilled water is also obtained without any additional consumption of heat.

In accordance with a preferred embodiment of the method of the present invention the salts obtained are dried and utilized in subsequent manufacturing processes such as, for example, the manufacture of nitroguanidine, while the distillation vapors which are freed of salt may be used in quantities up to 25 to 30% for example in the same method to dilute sulfuric acid at a concentration level of, 62 to 85%.

The method of the present invention may be used both with inorganic and organic acids and alkalies.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The FIGURE is a flow diagram of the process of the invention in which acid bearing aqueous vapors are distilled from a distillation unit and then passed to a unit containing an aqueous base solution, followed by distillation of the neutralized solution is a second distillation unit and condensation of the acid free vapors discharged from the second distillation unit.

The invention will now be described in greater detail by way of the following examples:

EXAMPLE 1

In a method of manufacturing nitroguanidine using aqueous sulfuric acid, approximately 10 ton of 25 to 30% sulfuric acid and nitric acid in a ratio of 95 : 5 are obtained for each ton of nitroguanidine produced. The sulfuric acid obtained is concentrated to 82 to 85% for re-use.

Sulfuric acid containing approximately 5% nitric acid is concentrated in several stages by using a reduced pressure of 200–15 Torr. Up to a concentration of 37% sulfuric acid, only insignificant quantities of nitric acid are carried along with the distillation vapours. At concentrations from 37% up to approximately 65% all of the nitric acid passes along with the distillation vapors.

These distillation vapors were neutralized after condensation by means of alkalies such as ammonia, or sodium or calcium oxide. However such nitrate salt containing aqueous solutions may no longer be discarded as an effluent, because of the laws which regulate the purity of river water.

In the removal of nitric acid from the distillation vapors, 65% aqueous solution of ammonium nitrate is pumped around a column filled with Raschig rings, this solution being kept at the distillation temperature and having the same boiling point as the distillate in a vacuum of 200–100 Torr. The distillation vapors are passed through the column. Liquid ammonia or commercially available 25% ammonia is passed into the solution of ammonium nitrate in a quantity such that the pH of the solution remains between 4 and 6.

The nitric acid contained in the distillation vapors is converted into ammonium nitrate.

In order to keep the quantity of the circulating 60 to 65% ammonium nitrate solution at the same level, a proportion of the salt solution is continuously centrifuged from the circulating solution.

The water vapor which is discharged from the column has not undergone any change in temperature and is free of acid.

The ammonium nitrate solution at a concentration of 65% may be used as it is, or in the form of water-free ammonium nitrate obtained from the concentrated solution in the manufacture of an initial product for the production of nitroguanidine, namely guanidine nitrate and the acid-free water vapors is used to dilute a dehydrated solution of nitroguanidine.

EXAMPLE 2

With the method described in Example 1 for manufacturing nitroguanidine, 45 to 50% guanidine nitrate is circulated in the column filled with Raschig rings used in Example 1 instead of the 65% aqueous ammonium nitrate solution, the guanidine nitrate solution being at the same temperature and pressure ratio as the sulfuric acid distillation vapors The nitric acid in the distillation vapors is neutralized with guanidine carbonate.

Nitric acid is converted by guanidine carbonate into guanidine nitrate. The carbon dioxide thus released and the condensed distillate are obtained in pure form.

The guanidine nitrate reaction product which is obtained at 250 Torr at a distillation temperature of 70° C. has a concentration of 45%.

The solution is cooled to 0° C. whereupon 98% of the guanidine nitrate crystallizes. The guanidine nitrate is separated from the water by centrifuging and the crystals, which still contain 4 to 6% water, are dried. The guanidine nitrate obtained has a purity of 99.0% and may be used to manufacture nitroguanidine.

EXAMPLE 3

The following represents a reaction scheme; for the production of guanidine nitrate from urea and ammonium nitrate.

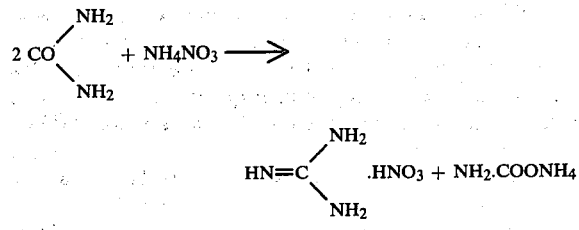

The process results in a yield of product of 88-93% relative to the amount of urea employed. To maintain the reaction melt in a liquid state and to avoid the production of considerable quantities of triazine by-products such as melamine, ammeline and ammelide, the presence of excess ammonium nitrate in the reaction is necessary. Nevertheless, even under these conditions, from 1-2% of these triazines are formed which result in the release of small quantities of ammonia. These vapors at about 100° C. are passed through an aqueous ammonium nitrate solution at a temperature of about 60°-100° C. with a pH of 3-5 to an extent at which the ammonia present in the vapors is neutralized by the ammonium nitrate in solution thereby resulting in the production of ammonium nitrate as a result of the addition of nitric acid to these vapors. Nitric acid is added to these vapors so that the concentration of the hydrogen ions is maintained in solution at a pH of 3-5. The gases remaining which are free of $NH_3$, and which are principally steam, may be condensed or released into the atmosphere.

Since at 100° C. no steam will condense to water, the ammonia present in the gas is obtained as ammonium nitrate from the vapors without additional any power requirements and can be used in additional processes.

I claim:

1. A method of separating an acid from distillation vapors containing the same during concentration of an aqueous acidic solution, comprising:

passing said distillation vapors containing said acid at a given existing pressure and temperature through a salt solution which boils at said temperature and pressure, the salt of said salt solution having an anion corresponding to the anion of the acid;

adding a base to said salt solution in the amount necessary to neutralize the acid, the cation of the base being the same cation as that of the salt;

distilling the salt solution thereby separating said salt from the solution; and condensing the distilled vapors as water free of acid impurity.

2. A method for separating an acid from aqueous distillation vapors, comprising:

concentrating a sulfuric acid solution containing nitric acid at a sulfuric acid concentration of 35% to 70% under a reduced pressure thereby generating distillation vapors containing nitric acid;

passing said distillation vapors into an aqueous ammonium nitrate solution having a boiling point coinciding with the temperature of the distillation vapors at a reduced pressure of 100-200 torr;

passing liquid ammonia into said salt solution in a quantity sufficient to effectively retain its pH value while withdrawing amounts of the salt solution in order to maintain the concentration of salt in said solution at a relatively constant level as the salt is continually formed by neutralization of said nitric acid;

distilling the salt solution thereby separating said salt from the solution; and condensing the acid free water vapors obtained.

3. The method of claim 2, wherein said ammonia is added to said salt solution as a liquified gas or as a 25 wt % ammonium hydroxide solution.

4. The method of claim 2, wherein a portion of said ammonium nitrate solution is continuously withdrawn in order to maintain the amount of said salt solution constant.

5. A method of separating an acid from aqueous distillation vapors, comprising:

concentrating a sulfuric acid solution containing nitric acid at a sulfuric acid concentration of 35% to 70% under a reduced pressure, thereby generating distillation vapors containing nitric acid;

passing said distillation vapors into an aqueous guanidine nitrate solution having a boiling point coinciding with the temperature of the distillation vapors at a reduced pressure of 100-200 torr;

passing guanidine carbonate into said salt solution in a quantity sufficient to effectively retain its pH value while withdrawing amounts of the salt solution in order to maintain the concentration of salt in said solution at a relatively constant level as the salt is continually formed by neutralization of said nitric acid;

distilling the salt solution thereby separating said salt from the solution; and condensing the acid free water vapors obtained.

6. The method of claim 5, wherein a portion of the guanidine nitrate solution is continuously withdrawn in order to maintain the amount of salt solution constant.

7. The method of claim 6, wherein guanidine nitrate is recovered from said salt solution by crystallization and centrifugation.

* * * * *